UNITED STATES PATENT OFFICE.

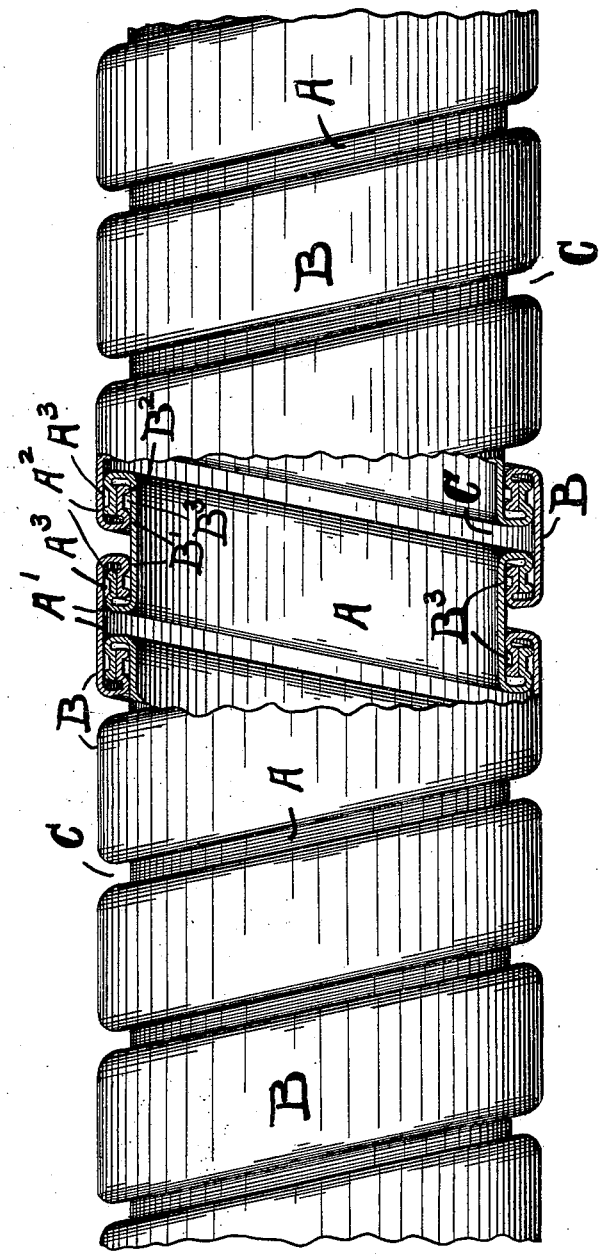

FREDERICK G. FRANKENBERG, OF CHICAGO, ILLINOIS, ASSIGNOR, BY MESNE ASSIGNMENTS, TO AMERICAN METAL HOSE COMPANY, OF CHICAGO, ILLINOIS, A CORPORATION OF ILLINOIS.

FLEXIBLE METALLIC TUBING.

SPECIFICATION forming part of Letters Patent No. 693,000, dated February 11, 1902.

Application filed May 31, 1901. Serial No. 62,487. (No model.)

*To all whom it may concern:*

Be it known that I, FREDERICK G. FRANKENBERG, a citizen of the United States of America, and a resident of Chicago, county of Cook, and State of Illinois, have invented certain new and useful Improvements in Flexible Metallic Tubing, of which the following is a specification.

My invention relates to metallic tubing, and has for its object the construction of a tubing which will have all of the indestructible characteristics of an ordinary metal pipe, together with the flexibility of an ordinary rubber hose. To accomplish this result, I use two metal ribbons, the edges of which are turned over, and these two ribbons are coiled into helices, one being of a slightly larger diameter than the other and the two being arranged so that the bent edges interlock with each other to permit movement to a limited extent.

In the accompanying drawing, A represents a ribbon which is coiled into the interior helix, the edges of which are turned up into exterior flanges and bent back parallel with the axis of the helix.

B represents an exterior ribbon which has its flanges bent inward and of a shape corresponding to those on the ribbon A. The flange of the ribbon A is represented at A', and this flange is bent, as shown in the drawing, (which is an elevation, partly in section,) so that the extreme edge of it is turned outward, as shown at A². Between the bulges at A' and A² there is left a space, (marked A³.) Similarly the ribbon B has its flange B' bent up into a lip B², leaving a space B³. The outside of the flange of the inner ribbon engages the inner face of the outer ribbon, and, conversely, the inner face of the flange on the outer ribbon B engages the outer face of the inner ribbon A. The point of contact between the two flanges is practically a straight line as viewed in section and is a helix in actual form. The point of contact between the flanges of one ribbon and the corresponding face of the other ribbon is also parallel with the axis of the helix formed by the two ribbons. As thus constituted the two ribbons may slide slightly on each other without any resistance except such as is due to the simple friction between them. The open spaces A³ and B³ are left for the purpose of inserting a packing, which is run into these spaces during the process of coiling and uniting the two coils together. As thus made the space C between one coil of a helix and the next coil of the same helix is less than the space of contact between the two flanges which engage each other. Consequently the said flanges cannot slip out of engagement after the tube has once been formed and pressed together in the process of making. The spaces C on the interior of the tubing are thus made in the form of screw-threads, into which a bushing or other device may be readily screwed. The same spaces C on the exterior also form screw-threads, upon which a nut may be screwed. A tubing made in the form herein described may be bent, in which case the inner portion of the curve of such a bend will have the spaces C contracted, and the same spaces C on the exterior of the curve will be expanded or spread apart by virtue of the slipping of the flanges upon each other, as hereinbefore described. The interior ribbon A being broad in comparison to the interior groove C, the ribbon A will be subjected to a greater pressure from water or compressed gas within the tube than will be the exterior ribbon B. The effect of this pressure is to increase the tightness between the flanges of the interlocking ribbons, and consequently the greater the pressure within the tube the tighter it will be at its joints.

What I claim is—

1. The combination with a helically-wound ribbon of metal having its edges bent outward and folded back so as to leave exterior helical channels having flat surfaces parallel with the axis of the helix, of a second helically-wound ribbon of metal having its edges similarly bent inward and interlocking with the outwardly-bent edges of the first ribbon, said interlocking edges of the two ribbons being adapted to freely slide upon each other to a limited extent, substantially as described.

2. The combination with a helically-wound interior ribbon provided with exterior flanges, of a similar exterior ribbon provided with interior flanges, said ribbons being arranged so that their flanges will interlock and slip on each other, and said flanges being bent so as to provide spaces for packing, substantially as described.

3. The combination with a helically-wound interior ribbon provided with exterior flanges, of a similar exterior ribbon provided with interior flanges, said ribbons being arranged so that their flanges will interlock and slip on each other, substantially as described.

Signed at Chicago, Illinois, this 25th day of May, 1901.

FREDERICK G. FRANKENBERG.

Witnesses:
  GEO. H. ENNIS,
  WM. A. ROWLAND.